May 2, 1950 — E. H. SCOVELL — 2,505,839

AIR OPERATED GREASE GUN

Filed Aug. 20, 1945

Inventor
ERIC HERBERT SCOVELL
By Haseltine, Lake & Co.
Attorneys

Patented May 2, 1950

2,505,839

UNITED STATES PATENT OFFICE 2,505,839

AIR OPERATED GREASE GUN

Eric Herbert Scovell, Glandore, South Australia,
Australia

Application August 20, 1945, Serial No. 611,595
In Australia August 14, 1944

8 Claims. (Cl. 222—262)

This invention relates to an improved air operated grease gun, and in particular it relates to a gun of the automatic type which will eject grease through a nozzle so long as the trigger of the gun is pressed.

The objects of the invention are to provide an improved feed of grease to the operating plunger of the gun, the entire unit being air operated and having positive feeding means whereby the grease from a container is forced by air pressure into the bore in which the packing plunger, which forces the grease through the nipple, operates, the feed being maintained only when the packing plunger is in operation.

Features of the invention are a grease container which can be readily placed in position and which has no external air line, the placing of the container in position automatically coupling same to the air supply in such a manner that the feed piston within same will be forced outwardly with the required pressure to maintain direct feed of the grease to the packing plunger when this plunger operates.

Advantages of a grease gun constructed according to my invention are thus; the grease will be maintained at the required pressure when the packing plunger operates to ensure correct feed to the plunger, the pressure being cut off when the air supply to the packing plunger is stopped, the arrangement also allowing ready changing of the grease containers so that varied grades of grease can be fed from the same gun without extensive alteration.

Figure 1:
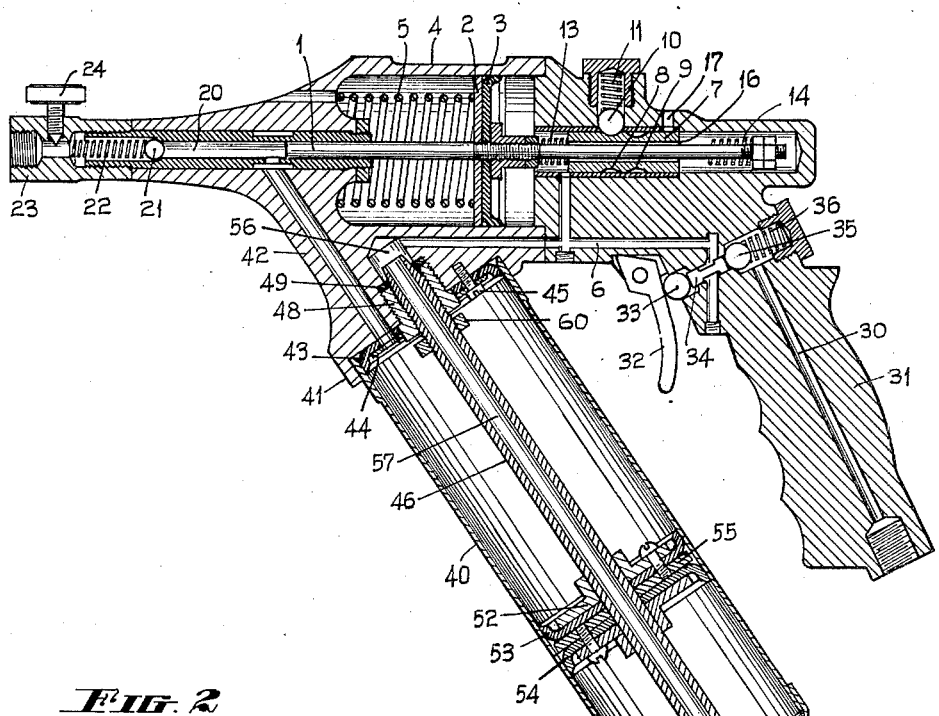
Figure 2:
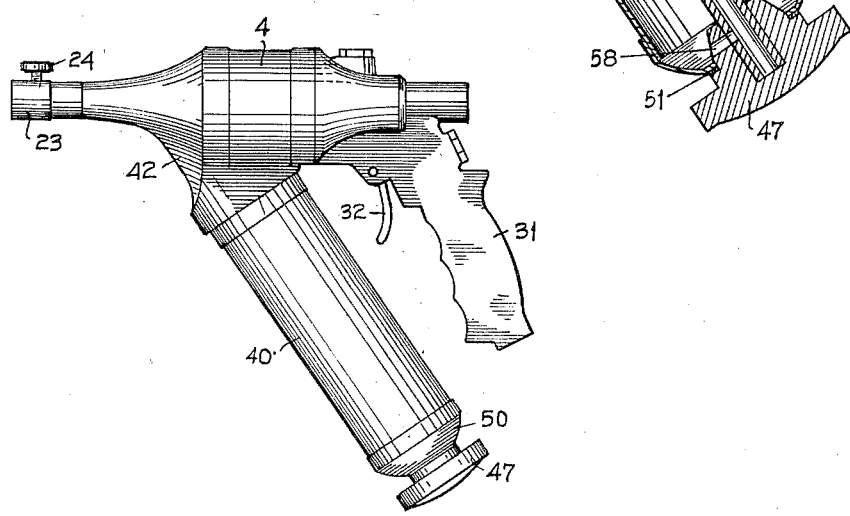

To enable the invention to be more clearly understood it will now be described with reference to the accompanying drawings in which:

Fig. 1 is a sectional longitudinal section of a gun constructed according to my invention, and Fig. 2 is an elevation of the gun to a smaller scale.

The air operated packing plunger 1 is of usual construction and is operated from a piston 2 fitted with a sealing washer 3, this piston being secured upon the packing plunger 1 and operating in a cylinder 4.

The packing plunger 1 is normally projected rearwardly by means of a spring 5 but is in communication with the pressure air duct 6 through a slide valve 7 which is provided with two circumferential grooves 8 and 9, these grooves co-operating with a ball 10 which is downwardly projected by a spring 11 so that it normally retains the valve member 7 in one or other of its positions.

The valve member loosely encircles an extension of the plunger 1 and is operated by means of a pair of springs 13 and 14, the springs being arranged to engage the ends of the plunger 1 and move same when the piston approaches the end of its stroke either during its forward or its return travel.

In the position shown in Fig. 1 the compressed air from the duct 6 is in communication with the inside of the cylinder 4 and thus with the sealing washer 3 on the piston 2, the air then moving the piston 2 forward against the pressure of the spring 5 until the spring 14 engages the end of the valve member 7 and displaces same forwardly so that the ball 10 is forced out of the groove 8 into the groove 9, this then cutting off the flow of air from the duct 6 but opening the cylinder, through the space 16, to the exhaust outlet 17, the air ducts 6 being closed off by the valve so that pressure air cannot reach the piston 2 this then allowing the spring 5 to return the piston 2 and withdraw the packing plunger 1 from its forward position.

The packing plunger 1 operates in the sleeve 20 which is provided with a nonreturn ball 21 having a loading spring 22, the sleeve 20 carrying at its front the nozzle 23 whereby attachment is made to the member which engages the normal grease nipple. An air valve 24 is provided to allow air to be bled from the unit when first placing a grease cylinder on same.

Pressure air to the ducts 6 is applied through a duct 30 in the handle 31, the flow of air being controlled by the trigger 32 which presses against the ball 33 which is coupled by means of a spacer 34 to a ball 35. The ball 35 is normally projected against its seat by means of a spring 36, which spring also serves to move the trigger outwardly to the off position. In the position shown in the drawings the ball 35 is against its seat and therefore closes off the air supply. When the trigger 32 is moved towards the handle 31, the ball 33 is forced down on to its seat to seal off the flow of air to the atmosphere which might otherwise take place, and through the spacer 34 lifts the ball 35 from its seat so that the duct 30 is placed into communication with the duct 6.

The grease container 40 has its one end open and has this end arranged to engage a socket 41 in the main frame member 42 of the gun, the socket 41 having secured within it a cup washer 43 which is so arranged that when the container 40 is pushed into position as shown in the drawing, this cup washer 43 forms a seal to prevent the egress of grease through this joint. The member 43 is held in position by means of a disc 44 held to the body 42 by means of screws 45.

The grease container 40 is held to the body 42 by a central hollow stem 46 which has at its one end an operating grip 47 and which has at the other end a thread to engage a gland 48 screwed into the body 42.

The gland 48 is provided at its end with a packing member 49, this gland serving to effect a seal with the end of the hollow stem 46 when this is screwed into position, thus preventing air from entering the grease space in the top of the grease container 40.

The member 47 passes loosely through the end 50 of the grease container 40, but a packing washer 51 makes an air seal at this locality.

Within the grease cylinder 40 is a piston 52 which is provided with a pair of sealing cups 53 and 54 disposed against a back plate 55 so that the cup 53 serves to form a seal to prevent the grease from moving past the piston while the cup 54 forms a seal for the air. The two sealing cups are held to the back plate 55 by independent sets of screws.

The air which operates the piston 52 flows from the duct 6 into the aperture 56 from which it enters the axial hollow 57 of the stem 46, it flowing down this hollow and entering the lower end of the cylinder 40 through a duct 58.

A collar 60 upon the stem 46 serves to draw the piston 52 back when the cylinder 40 is removed from the gun and when it is desired to recharge the cylinder with grease.

An advantage of the construction outlined is that the air pressure which forces the piston 52 forwardly to feed the grease into the sleeve 20 is cut off immediately the gun ceases to operate, that is to say the air supply to the piston 52 is cut off immediately the trigger 32 is released to stop the actuation of the packing plunger 1.

To place a grease cylinder 40 into position in the gun it is only necessary to insert the end of the cylinder into the socket 41 in the body 42, the screwed end of the stem 46 being engaged in the member 48 and screwed up, thus pulling the grease container 40 into the socket and forming a seal at the upper end by reason of the engagement of the washer 43 with the inside of this cylinder. The device is now ready for use and as soon as the trigger 32 is depressed to feed pressure air to the duct 6, this air will enter the lower end of the cylinder 40 to apply the required pressure to the underside of the piston 52.

What I claim is:

1. An improved air-operated grease gun comprising; a gun to inject grease, a packing plunger in such gun, a piston to operate said packing plunger, valve means to control the reciprocation of said piston, a trigger to control the flow of air to the valve means, a grease container adapted to be engaged on the gun, a piston within such container to feed the grease forward to the packing plunger, an air duct into the container to allow pressure air to move the piston, a duct to admit air to the container when the trigger is actuated to allow a flow of air to the valve means of the packing plunger, and valve means to open the grease container to atmospheric pressure when the trigger is not actuated.

2. An improved air-operated grease gun comprising; a gun to inject grease, a packing plunger in such gun, a piston to operate said packing plunger, valve means to automatically control the reciprocation of said piston, a trigger to control the flow of air to the valve means, a grease container adapted to be engaged on the gun, a piston within such container to feed the grease forward to the packing plunger, a hollow axial stem through the container to hold the container to the gun, communicating means for the pressure air from the pressure supply which operates the packing plunger to the hollow holding stem, communicating means for the air from the stem to the back of the piston, and valve means to open the grease container to atmospheric pressure when the trigger is not actuated.

3. An improved air-operated grease gun comprising; a gun to inject grease, a packing plunger in such gun, a piston to operate said packing plunger, valve means to automatically control the reciprocation of said piston, a trigger to control the flow of air to the said valve means, a socket on such gun, a grease container adapted to be engaged in the sosket, a sealing cup in the socket to engage the container, a piston within such container to feed the grease forward to the packing plunger, an air duct into the container to allow pressure air to move the piston, a duct to admit air to the container when the trigger is actuated to allow a flow of air to the packing plunger, and valve means to open the grease container to atmospheric pressure when the trigger is not actuated.

4. An improved air-operated grease gun comprising; a gun to inject grease, a packing plunger in such gun, a piston to operate said packing plunger, valve means to automatically control the reciprocation of said piston, a trigger to control the flow of air to the said valve means, a socket on such gun, a grease container adapted to be engaged in the socket, sealing means in the socket to engage the container, a piston within such container to feed the grease forward to the packing plunger, a hollow axial stem through the container to the gun, a screw thread on the stem, a screwed aperture in the gun to receive the threaded stem, communicating means for the pressure air from the pressure supply which operates the packing plunger to the said hollow stem, communicating means for the air from the stem to the back of the piston, and valve means to open the grease container to atmospheric pressure when the trigger is not actuated.

5. An improved air-operated grease gun comprising; a gun to inject grease, a handle on such gun, an air duct through the handle, a trigger adjacent to the handle, a pair of ball valves operated by the handle one to admit air to the operating mechanism of the gun and the other to exhaust air therefrom, a packing plunger in such gun, a piston to operate said packing plunger, valve means to automatically control the reciprocation of said piston, a grease container adapted to be engaged on the gun, a piston within such container to feed the grease forward to the packing plunger, an air duct into the container to allow pressure air to move the piston, a duct to admit air to the container when the trigger is actuated to allow a flow of air to the valve means of the packing plunger, and valve means to open the grease container to atmospheric pressure when the trigger is not actuated.

6. An improved air-operated grease gun comprising; a gun to inject grease, a handle on such gun, an air duct through the handle, a trigger adjacent to the handle, a pair of ball valves operated by the handle one to admit air to the operating mechanism of the gun and the other to exhaust air therefrom, a packing plunger in such gun, a piston to operate said packing plunger, valve means to automatically control the reciprocation of said piston, a grease container adapted to be engaged on the gun, a piston within such container to feed the grease forward to the packing plunger, a hollow axial stem through the container to hold the container to the gun, communicating means for the pressure air from the pressure supply which operates the packing plunger to the hollow holding stem, communicating means for the air from the stem to the back of the piston, and valve means to open the grease container to atmospheric pressure when the trigger is not actuated.

7. An improved air-operated grease gun comprising; a gun to inject grease, a handle on such gun, an air duct through the handle, a trigger adjacent to the handle, a pair of ball valves operated by the handle one to admit air to the operating mechanism of the gun and the other to exhaust air therefrom, a packing plunger in such gun, a piston to operate said packing plunger, valve means to automatically control the reciprocation of said piston, a socket on such gun, a grease container adapted to be engaged in the socket, a sealing cup in the socket to engage the container, a piston within such container to feed the grease forward to the packing plunger, an air duct into the container to allow pressure air to move the piston, a duct to admit air to the container when the trigger is actuated to allow a flow of air to the packing plunger, and valve means to open the grease container to atmospheric pressure when the trigger is not actuated.

8. An improved air-operated grease gun comprising; a gun to inject grease, a handle on such gun, an air duct through the handle, a trigger adjacent to the handle, a pair of ball valves operated by the handle one to admit air to the operating mechanism of the gun and the other to exhaust air therefrom, a packing plunger in such gun, a piston to operate said packing plunger, valve means to automatically control the reciprocation of said piston, a socket on such gun, a grease container adapted to be engaged in the socket, sealing means in the socket to engage the container, a piston within such container to feed the grease forward to the packing plunger, a hollow axial stem through the container to the gun, a screw thread on the stem, a threaded member engaging the stem, a screwed aperture in the gun to receive the threaded member, communicating means for the pressure air from the pressure supply which operates the packing plunger to the said hollow stem, communicating means for the air from the stem to the back of the piston, and valve means to open the grease container to atmospheric pressure when the trigger is not actuated.

ERIC HERBERT SCOVELL.

REFERENCES CITED

The following references are of record in the file of this patent:

UNITED STATES PATENTS

| Number | Name | Date |
|---|---|---|
| 1,803,312 | Baker | May 5, 1931 |
| 1,856,372 | Bucket | May 3, 1932 |
| 2,096,367 | Wilson | Oct. 19, 1937 |
| 2,113,333 | Piquerez | Apr. 5, 1938 |
| 2,137,619 | Ames | Sept. 19, 1939 |
| 2,174,421 | Krannack | Sept. 26, 1939 |
| 2,317,872 | Zimt | Apr. 27, 1943 |